United States Patent
Jamieson (10) Patent No.: US 11,645,949 B2
(45) Date of Patent: May 9, 2023

(54) SOUND DETECTION ALERTS

(71) Applicant: SAP SE, Walldorf (DE)

(72) Inventor: Michael Jamieson, West Kelowna (CA)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/461,573

(22) Filed: Aug. 30, 2021

(65) Prior Publication Data

US 2023/0064906 A1  Mar. 2, 2023

(51) Int. Cl.
*G08B 21/00* (2006.01)
*G09B 21/00* (2006.01)
*G06F 16/61* (2019.01)
*G08B 21/02* (2006.01)
*G10L 25/51* (2013.01)
*G08B 5/00* (2006.01)

(52) U.S. Cl.
CPC ........... *G09B 21/009* (2013.01); *G06F 16/61* (2019.01); *G08B 5/00* (2013.01); *G08B 21/02* (2013.01); *G10L 25/51* (2013.01)

(58) Field of Classification Search
CPC .................................................. G09B 21/009
See application file for complete search history.

(56) References Cited

U.S. PATENT DOCUMENTS

| | | | |
|---|---|---|---|
| 10,045,143 B1* | 8/2018 | DeMarco | G08B 7/06 |
| 10,482,901 B1* | 11/2019 | Maurer | G10L 25/51 |
| 2018/0286279 A1* | 10/2018 | Alcaide Dias | G09B 21/009 |
| 2019/0026066 A1* | 1/2019 | Champy | G06F 3/162 |
| 2020/0241834 A1* | 7/2020 | Boeen | G06F 3/165 |
| 2022/0027725 A1* | 1/2022 | Nongpiur | G06N 7/005 |
| 2022/0164424 A1* | 5/2022 | Keith, Jr. | G06N 20/00 |
| 2022/0264234 A1* | 8/2022 | von Brasch | H04R 25/554 |

* cited by examiner

*Primary Examiner* — Travis R Hunnings
(74) *Attorney, Agent, or Firm* — Fountainhead Law Group P.C.

(57) ABSTRACT

Custom alerts may be generated based on sound type indicators determined using a machine learning classification model trained on user-provided sound recordings and user-defined sound type indicators. A device may provide a sound recording and a type indicator identifying an entity that made a sound in the recording for storage in a database that includes a plurality sound recordings associated with a plurality of type indicators. A machine learning classification model may be trained based on the stored recordings, including the user-defined recordings. The model may be used to classify sounds recorded by other devices and generate alerts identifying the type of sound. Thus, multiple users may contribute data to customize machine learning models that recognize sounds and generate alerts based on user-defined identifiers.

20 Claims, 8 Drawing Sheets

SOUND DETECTION ALERTS

BACKGROUND

The present disclosure pertains to sound detection alerts and in particular to causing alerts based on sound type indicators determined using a machine learning classification model trained on user-provided sound recordings and user-defined sound type indicators.

People who are deaf or hard of hearing often have difficulty in determining whether someone is speaking to them or when they need to respond to a sound in their vicinity. Deaf and hard of hearing people rely on visual cues to understand when someone is speaking to them. Without these prompts, they are likely to miss out on conversations or even misunderstand if someone is or is not addressing them. It is often impossible for a hearing person to recognize that someone is Deaf or hard of hearing upon initial contact with them. This is difficult at the best of times, but the problem has been compounded recently as more and more people are wearing facemasks due to COVID-19 pandemic. The responsibility for identifying this communication barrier generally falls to the Deaf or hard of hearing person who is at a disadvantage due to limited or absent audio cues.

Many people who are deaf and hard of hearing rely to some degree on lip-reading in communication with hearing people, either to simply recognize that someone is speaking or even to identify what they are saying. Lip reading is contingent on first knowing that someone is speaking to the person. Loud sounds are often missed or misinterpreted by deaf and hard of hearing people. Depending on their level of hearing loss, a deaf or hard of hearing person may be able to recognize that they are in proximity to a loud noise, but may not be able to identify what the noise or the source of the sound is.

While there are a variety of alerting devices available on the market for people with hearing loss, most of these are designed to deliver a visual, high-decibel audio and/or tactile alert for a single specific purpose, such as: smoke alarms, doorbells, baby monitors, alarm clocks, telephones. These devices generally replace conventional home-based systems on a one-to-one ratio. Once installed these devices may reliably serve the specific purpose they were designed for while the user is in their home. However, people who are deaf or hard of hearing may not always be at home where such devices are installed. They may be or work or in a public place. They might also be traveling to a different country that uses different sound frequencies or patterns for the same type of sound. For example, fire alarms and ambulance sirens sound different in different countries.

Accordingly, there is a need for improved sound detection alerts. The present disclosure addresses these issues and others, as further described below.

SUMMARY

One embodiment provides a computer system comprising one or more processors and one or more machine-readable medium coupled to the one or more processors. The one or more machine-readable medium storing computer program code comprises sets of instructions. The sets of instructions are executable by the one or more processors to receive a first sound recording data object and a first sound type indicator from a first device. The first sound type indicator identifies a first type of entity that made a first sound represented by the first sound recording data object. The computer program code further comprises sets of instructions to store the first sound recording data object and the first sound type indicator in a database. The first sound type indicator is associated with the first sound recording data object in the database. The database includes a plurality of sound recording data objects where each of the plurality of sound recording data objects is associated with one or more of a plurality of sound type indicators. The plurality of sound recording data objects includes a set of sound recording data objects representing sounds made by the first type of entity. The computer program code further comprises sets of instructions to train a machine learning classification model based on the first sound recording data object from the first device, the first sound type indicator from the first device, the plurality of sound recording data objects, and the one or more of the plurality of sound type indicators associated with the plurality of sound recording data objects. The machine learning classification model is configured to receive an input sound recording data object and provide an output sound type indicator. The computer program code further comprises sets of instructions to receive a second sound recording data object from a second device. The second sound recording data object represents a second sound made by the first type of entity. The computer program code further comprises sets of instructions to determine that the second sound recording data object was made by the first type of entity by applying the second sound recording data object to the machine learning classification model. The computer program code further comprises sets of instructions to send the first sound type indicator identifying the first type of entity to the second device.

Another embodiment provides one or more non-transitory computer-readable medium storing computer program code. The computer program code comprises sets of instructions to receive a first sound recording data object and a first sound type indicator from a first device. The first sound type indicator identifies a first type of entity that made a first sound represented by the first sound recording data object. The computer program code further comprises sets of instructions to store the first sound recording data object and the first sound type indicator in a database. The first sound type indicator is associated with the first sound recording data object in the database. The database includes a plurality of sound recording data objects where each of the plurality of sound recording data objects is associated with one or more of a plurality of sound type indicators. The plurality of sound recording data objects includes a set of sound recording data objects representing sounds made by the first type of entity. The computer program code further comprises sets of instructions to train a machine learning classification model based on the first sound recording data object from the first device, the first sound type indicator from the first device, the plurality of sound recording data objects, and the one or more of the plurality of sound type indicators associated with the plurality of sound recording data objects. The machine learning classification model is configured to receive an input sound recording data object and provide an output sound type indicator. The computer program code further comprises sets of instructions to receive a second sound recording data object from a second device. The second sound recording data object representing a second sound made by the first type of entity. The computer program code further comprises sets of instructions to determine that the second sound recording data object was made by the first type of entity by applying the second sound recording data object to the machine learning classification model. The computer program code further comprises sets of instructions to send the first sound type indicator identifying the first type of entity to the second device.

Another embodiment provides a computer-implemented method. The method includes receiving a first sound recording data object and a first sound type indicator from a first device. The first sound type indicator identifies a first type of entity that made a first sound represented by the first sound recording data object. The method further includes storing the first sound recording data object and the first sound type indicator in a database. The first sound type indicator being associated with the first sound recording data object in the database. The database including a plurality of sound recording data objects where each of the plurality of sound recording data objects is associated with one or more of a plurality of sound type indicators. The plurality of sound recording data objects includes a set of sound recording data objects representing sounds made by the first type of entity. The method further includes training a machine learning classification model based on the first sound recording data object from the first device, the first sound type indicator from the first device, the plurality of sound recording data objects, and the one or more of the plurality of sound type indicators associated with the plurality of sound recording data objects. The machine learning classification model configured to receive an input sound recording data object and provide an output sound type indicator. The method further includes receiving a second sound recording data object from a second device. The second sound recording data object representing a second sound made by the first type of entity. The method further includes determining that the second sound recording data object was made by the first type of entity by applying the second sound recording data object to the machine learning classification model. The method further includes sending the first sound type indicator identifying the first type of entity to the second device.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein. While certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order.

As mentioned above, people who are deaf or hard of hearing often have difficulty in determining whether someone is speaking to them or when they need to respond to a sound in their vicinity. Deaf and hard of hearing people rely on visual cues to understand when someone is speaking to them. Without these prompts, they are likely to miss out on conversations or even misunderstand if someone is or is not addressing them. It is often impossible for a hearing person to recognize that someone is Deaf or hard of hearing upon initial contact with them. This is difficult at the best of times, but the problem has been compounded recently as more and more people are wearing facemasks due to COVID-19 pandemic. The responsibility for identifying this communication barrier generally falls to the Deaf or hard of hearing person who is at a disadvantage due to limited or absent audio cues.

Many people who are deaf and hard of hearing rely to some degree on lip-reading in communication with hearing people, either to simply recognize that someone is speaking or even to identify what they are saying. Lip reading is contingent on first knowing that someone is speaking to the person. Loud sounds are often missed or misinterpreted by deaf and hard of hearing people. Depending on their level of hearing loss, a deaf or hard of hearing person may be able to recognize that they are in proximity to a loud noise, but may not be able to identify what the noise or the source of the sound is.

While there are a variety of alerting devices available on the market for people with hearing loss, most of these are designed to deliver a visual, high-decibel audio and/or tactile alert for a single specific purpose, such as: smoke alarms, doorbells, baby monitors, alarm clocks, telephones. These devices generally replace conventional home-based systems on a 1:1 ratio. Once installed these devices may reliably serve the specific purpose they were designed for while the user is in their home. However, people who are deaf or hard of hearing may not always be at home where such devices are installed. They may be at work or in a public place. They might also be traveling to a different country that uses different sound frequencies or patterns for the same type of sound. For example, fire alarms and ambulance sirens sound different in different countries.

The present disclosure provides sound detection alert systems, computer readable medium, and methods to address these problems. As further described below, an application on a mobile device (e.g., smart phone or tablet) or a wearable device (e.g., smartwatch) may be configured to identify speech patterns and fluctuations/peaks in ambient sound which may indicate that someone is speaking directly to the user. The application may also be capable of recognizing sounds such as sirens, alarms, knocking, shouting, approaching traffic, bicycle bells or other noises that the user should be alerted to. The device identifies these sounds using a machine learning classification model. The machine learning classification model may be provided by a sound detection system. The sound detection system may be implemented by a cloud platform or other computer server. The sound detection system may be accessible over a network such as the Internet. The machine learning classification model may be accessible to the application by an application programming interface provided by the sound detection system. In some embodiments, the sound detection system may provide a machine learning classification model to the device for use in offline sound detection (e.g., without network access to the sound detection system).

The application may be configured to notify the user of the device via visual (e.g., icons, text, and visualizations), tactile, or haptic alerts (e.g., vibration) on or by the device. The alerts may be customized by the user within the application to indicate specific sounds by providing a corresponding message/color/vibration pattern that has been matched to each sound.

The application may be configured to detect sounds from all sorts of conventional devices and creates visual/tactile alerts on common mobile and wearable devices. With the application, there is no need to replace conventional home-based devices with multiple dedicated alerting devices that each serve a single purpose. While the application is running on a mobile, paired or wearable device, it may be used anywhere the user goes (e.g., work, out in public, or traveling to a different country) and with any interfacing sources. At home, the application may interface with devices via audio monitoring, or with Bluetooth-paired home automation devices such as smart speakers, doorbells, smoke detectors, etc.

The application may be a standalone application for use on smartphones or connected Bluetooth devices. The sound detection system may be provided with a sound library of standard sounds (e.g., keywords, alarms, sirens, etc.) and the sound library may be updated with user-defined sounds. The user-defined sounds may comprise sound recordings and user-defined sound type indicators (e.g., labels or tags) that may be uploaded to the sound detection system. On the application, each sound may be associated with a visual/tactile alert. The application may provide for notifications to be edited (e.g., name of voice, type of alarm, etc.) The application may be configured to be active at certain times or to be turned on or off manually. The application may provide a persistent listening mode that may begin recording and storing sound upon detection of certain predetermined audio, thereby minimize power consumption for extended battery life. The application may provide advanced sound recognition to identify specific sounds and avoid nuisance alerts. The application may provide background noise filtering to identify sounds of interest. The application may also be configured to receive and store a machine learning classification model to be used for offline sound detection. The application may provide a user interface for selecting a set of sound type indicators to be used with the offline machine learning classification model. The sound detection system may be configured to generate and train a custom machine learning model based on the users selected set of sound type indicators.

The sound detection system includes a database of common sounds recorded along with indicators (e.g., labels, tags, or descriptors) identifying the type of sound (e.g., fire alarm, shower, ambulance, dog bark, speech, etc.). This library of sounds may be supplemented with user defined indicators and sound recording data captured and uploaded from user devices. The sound detection system may then use the sound library and corresponding indicators as training data for generating and training a machine learning classification model. User devices may then send sound recording data to the sound detection system, which applies the sound recording data to the machine learning model to determine a sound type indicator. The sound type indicator may be sent to the device and it may cause the device to issue an alert. The sound detection system and user device alerts are further described below.

Figure 1:
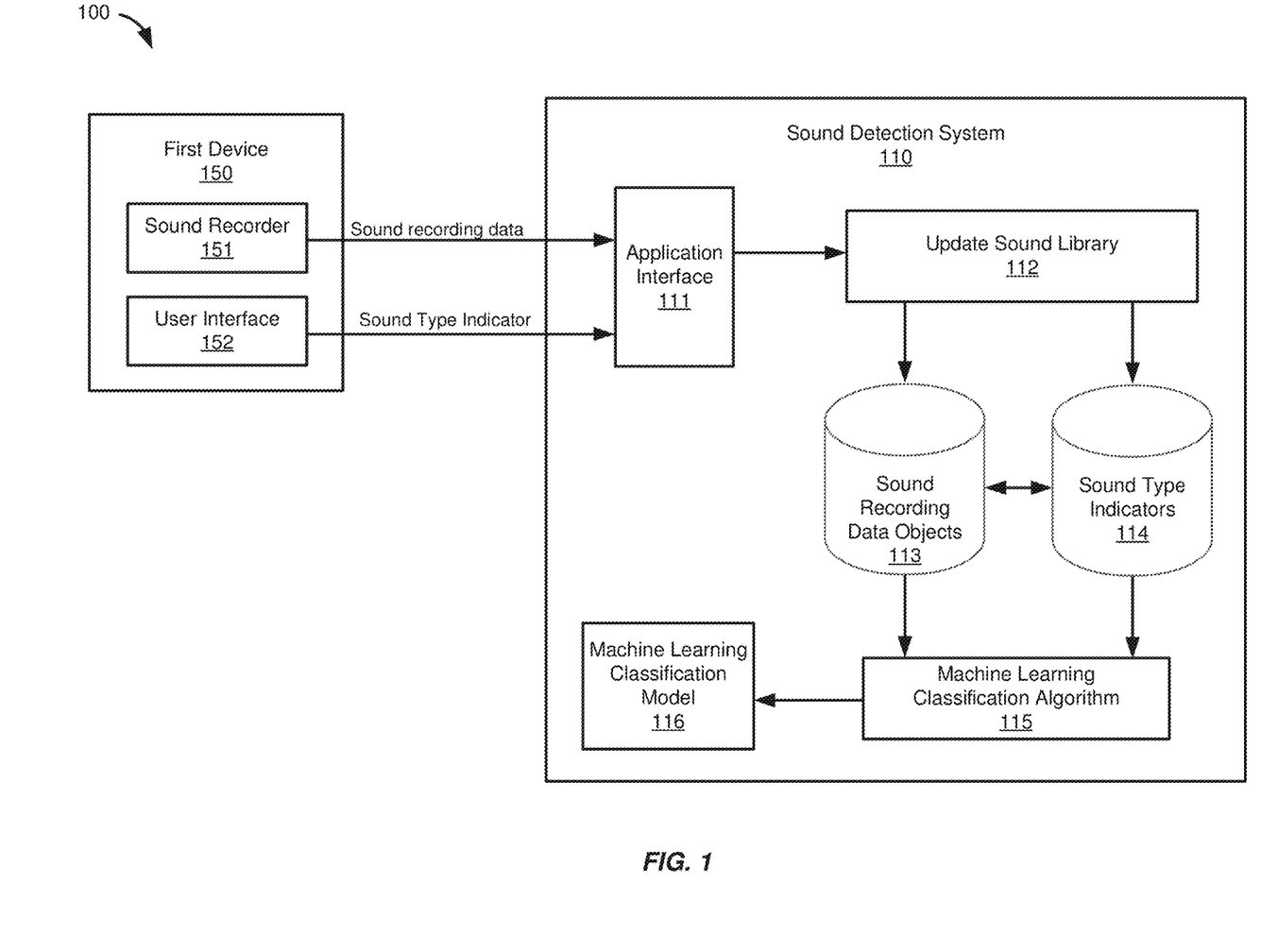
FIG. 1 shows a diagram of a sound detection system updating a sound library and generating a machine learning classification model, according to an embodiment.

FIG. 1 shows a diagram 100 of a sound detection system 110 updating a sound recording database and generating a machine learning classification model 116, according to an embodiment. The sound detection system 110 may be implemented by a cloud platform. The sound detection system 110 may include one or more server computers, including a database server. The sound detection system 110 includes an application interface 111 (e.g., application programming interface) for receiving sound recording data and sound type indicators from mobile devices. The sound detection system 110 also includes a database of sound recording data objects 113 and a database or table of sound type indicators 114. The database of sound recording data objects 113 and database of sound type indicators 114 may be referred to as a "sound library." The sound detection system 110 may perform a process 112 to update the sound library as described herein. The sound library may be used by a machine learning classification algorithm 115 to generate and train a machine learning classification model 116. The machine learning classification model may be configured to output a sound type indicator based on an input sound recording data.

The sound recording data objects may be audio sound files or they may be data representing multidimensional charts or graphs of the sound (e.g., by frequency, time, amplitude, etc.).

The sound detection system 110 may be configured to update the sound library with custom sound recordings provided by users of an application running on a mobile device as described herein. The first device 150 is such a mobile device and it may be implemented by a smart phone, tablet, or smart watch, for example. In FIG. 1, the first device 150 includes a sound recorder 151 which may persistently listen for sounds and make a recording when sound is detected. The recording may be preprocessed and/or transformed into a sound recording data object. The user interface 152 of the first device 150 may be used to determine or select one or more sound type indicators corresponding to the sound recording data. For example, a user may record a sound of their own house fire alarm, label the recording of the fire alarm with a "fire alarm" sound type indicator, and send the sound recording data and the sound type indicator to the application interface 111 of the sound detection system 110. The new sound recording data and indicator may be used in an update process 112 for updating the sound library including the sound recording data objects 113 and the sound type indicators 114.

The machine learning classification algorithm 115 may be run periodically (e.g., daily or weekly) and determine an updated machine learning classification model 116 that is based on the user provided sound recording data and the user provided sound type indicators. This system is advantageous because users from all over the world may provide labeled training data to use for training the machine learning model. Because of this, the machine learning model may be able to identify variations of the different types of sounds across different models of entities or in different countries, etc. For example, users from various different countries may provide recordings of emergency vehicles all having different sound frequencies, pitches, and siren patterns but each labeled with the "emergency vehicle" sound type indicator. Based on this training data, the machine learning classification model may be able to determine emergency vehicle sounds all across the globe, enabling sound detection alerts for deaf or hard of hearing people while they travel.

Figure 2:
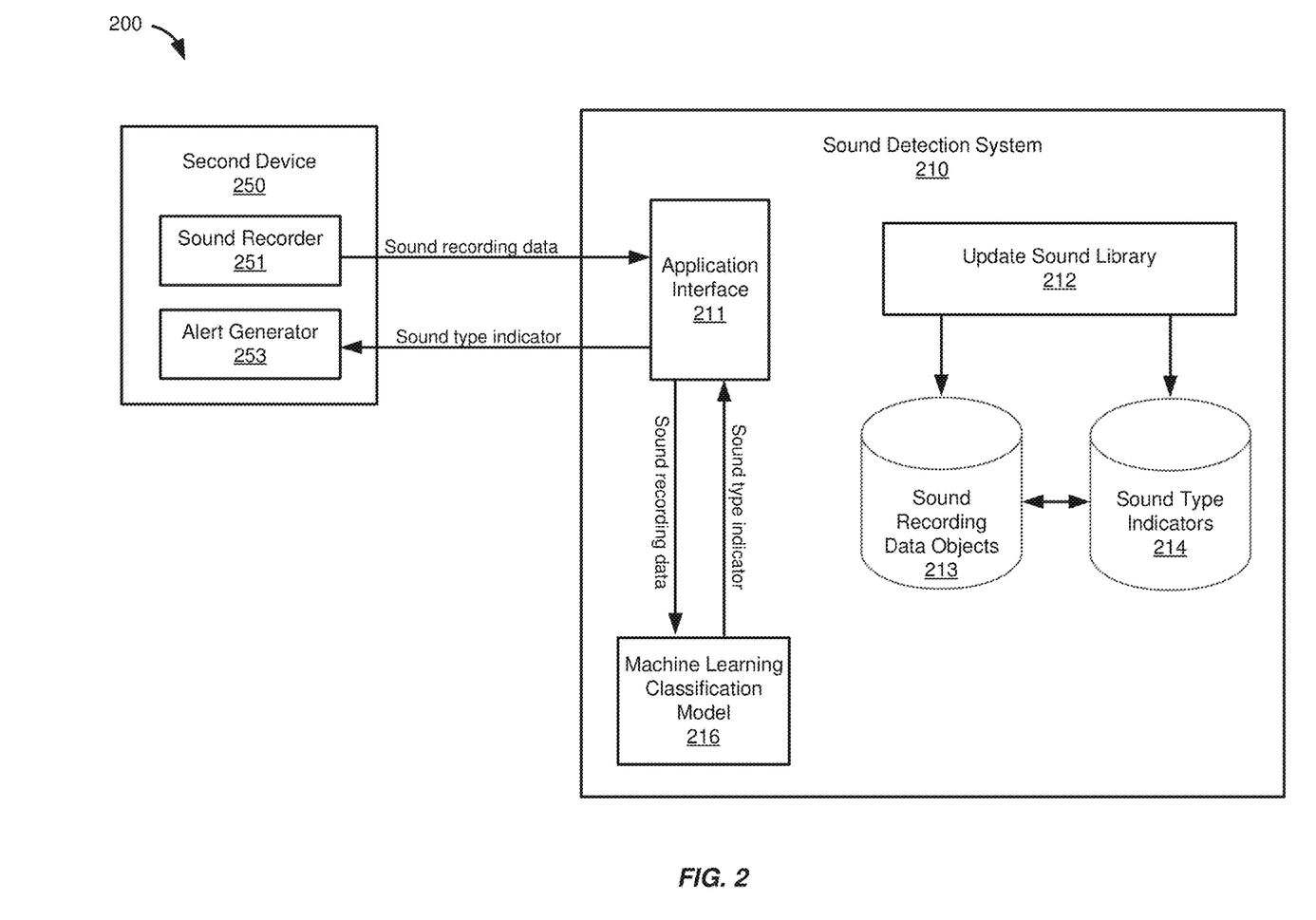
FIG. 2 shows a diagram of a sound detection system determining a sound type indicator, for causing an alert, using a machine learning classification model, according to an embodiment.

FIG. 2 shows a diagram 200 of a sound detection system 210 determining a sound type indicator, for causing an alert, using a machine learning classification model 216, according to an embodiment. The sound detection system 210 of FIG. 2 may be configured similar to the sound detection system 110 of FIG. 1. The sound detection system 210 may be implemented by a cloud platform. The sound detection system 210 may include one or more server computers, including a database server. The sound detection system 210 includes an application interface 211 (e.g., application programming interface) for receiving sound recording data from mobile devices. The sound detection system 210 also includes a database of sound recording data objects 213 and a database or table of sound type indicators 214. The database of sound recording data objects 213 and database of sound type indicators 214 may be referred to as a "sound library." The sound detection system 210 may perform a process 212 to update the sound library as described here. The sound library may have been used to generate a machine learning classification model 216 using a process similar to that described above with respect to FIG. 1.

The second device 250 may be configured similar to the first device 150 of FIG. 1. The second device 250 includes a sound recorder 251 and an alert generator 253. The sound recorder 251 persistently listens for sounds and then sends sound recording data to the application interface 211 as described above in FIG. 1. However, in FIG. 2 the second device 250 does not send a sound type indicator. Instead, the second device sends a request to determine what the sound type indicator is. The application interface 211 provides the sound recording data as input to a machine learning classification model 216. The machine learning classification model 216 outputs a sound type indicator to the application interface 211. The application interface 211 sends the sound type indicator to an alert generator 253 of the second device 250 to cause the second device to generate an alert. The types of alerts are further described herein.

Figure 3:
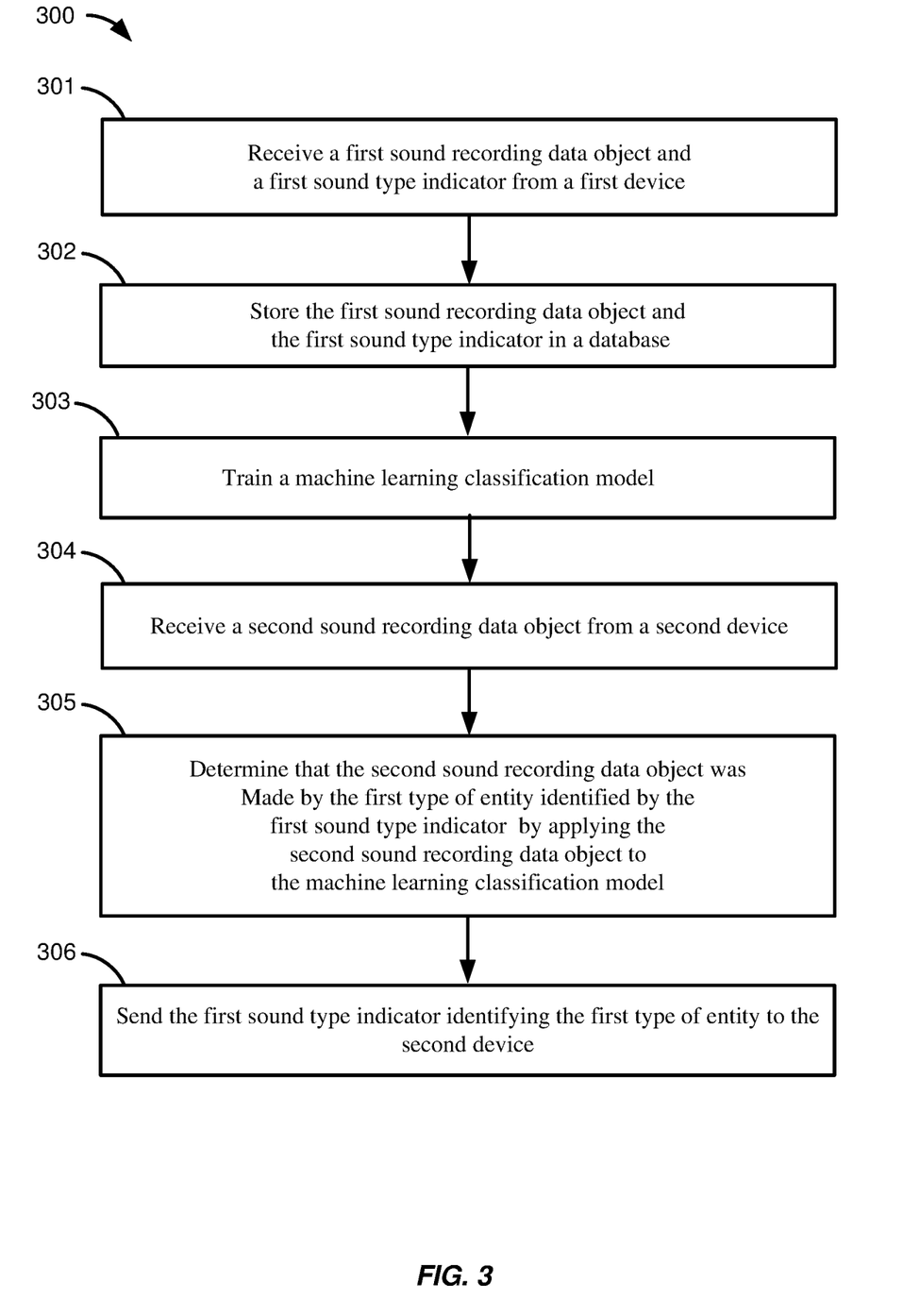
FIG. 3 shows a flowchart of a method for sound detection alerts, according to an embodiment.

FIG. 3 shows a flowchart 300 of a method for sound detection alerts, according to an embodiment. The method may be implemented by a sound detection system as described herein.

At 301, the method may receive a first sound recording data object and a first sound type indicator from a first device. The first sound type indicator may identify a first type of entity that made a first sound represented by the first sound recording data object.

At 302, the method may store the first sound recording data object and the first sound type indicator in a database. The method may preprocess the first sound recording data object before the storing of the sound recording data object in the database. The preprocessing of the first sound recording data object including performing noise reduction on the first sound recording data object. In some embodiments the first device may perform preprocessing of the sound recording data object.

The first sound type indicator may be associated with the first sound recording data object in the database. The database may include a plurality of sound recording data objects. Each of the plurality of sound recording data objects may be associated with one or more of a plurality of sound type indicators. The plurality of sound recording data objects includes a set of sound recording data objects representing sounds made by the first type of entity.

At 303, the method may train a machine learning classification model based on the first sound recording data object from the first device, the first sound type indicator from the first device, the plurality of sound recording data objects, and the one or more of the plurality of sound type indicators associated with the plurality of sound recording data objects. The machine learning classification model configured to receive an input sound recording data object and provide an output sound type indicator.

At 304, the method may receive a second sound recording data object from a second device. The second sound recording data object representing a second sound made by the first type of entity. The method may preprocess the second sound recording data object before the applying the second sound recording data object to the machine learning classification model.

At 305, the method may determine that the second sound recording data object was made by the first type of entity identified by the first sound type indicator by applying the second sound recording data object to the machine learning classification model.

At 306, the method may send the first sound type indicator identifying the first type of entity to the second device. The sending of the first sound type indicator identifying the first type of entity to the second device may cause the second device to generate an alert identifying the first type of entity to a user of the second device. The alert may include one or more of a visual notification by the second device or a haptic notification by the second device.

In some embodiments the method may include providing the machine learning classification model to the first device or the second device.

Figure 4:
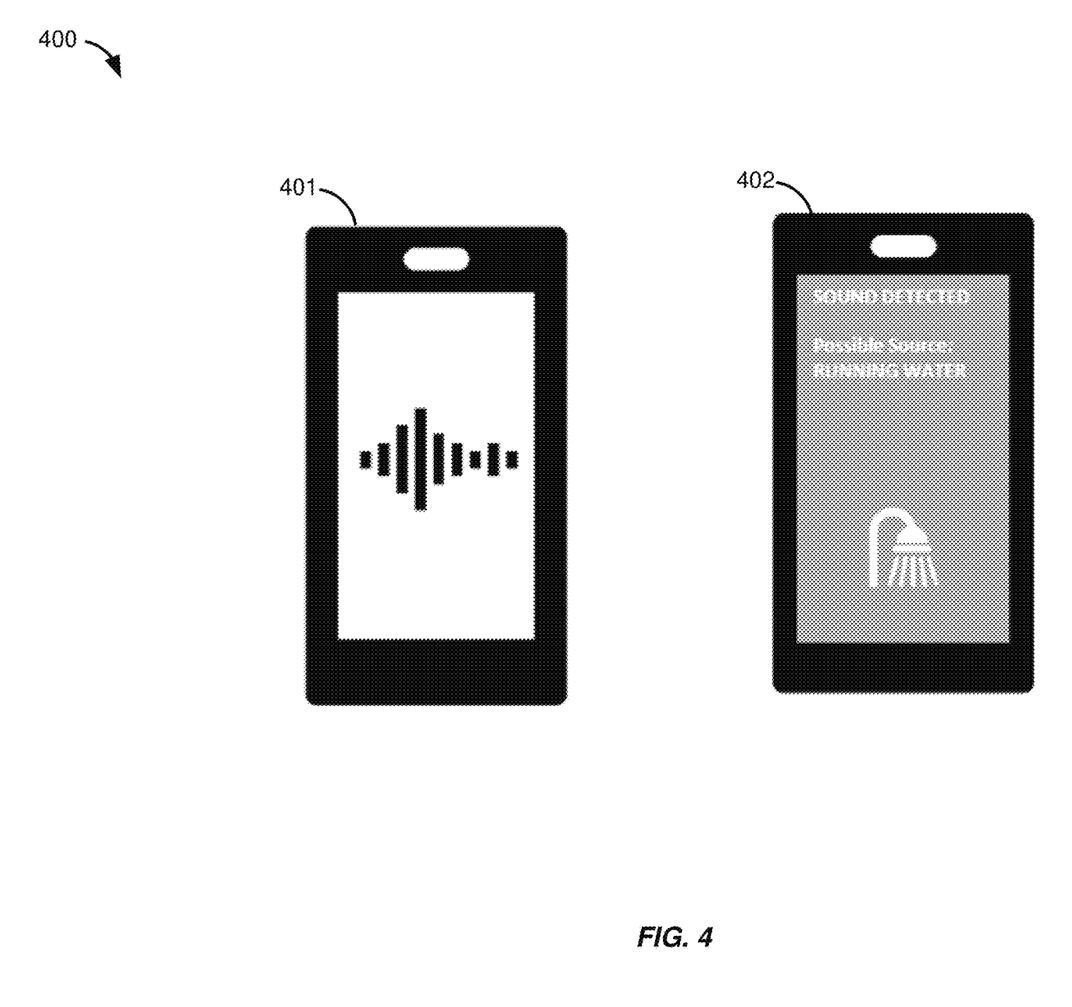
FIG. 4 shows a diagram of an exemplary sound recording and corresponding visual alert on a mobile device, according to an embodiment.

FIG. 4 shows a diagram 400 of an exemplary sound recording 401 and corresponding visual alert 402 on a mobile device, according to an embodiment. As described above, a mobile device (e.g., smart phone or tablet) may persistently listen for sounds and when sound is detected the mobile device may send sound recording data to a sound detection system to determine a sound type indicator, or it may use a stored machine learning classification model to determine the sound type indicator.

In this example, the sound of a shower is detected by a persistent listening algorithm and sound recording data representing the sound of the shower is applied to a machine learning classification model, either one provided by the sound detection system over an application programming interface or a machine learning classification model stored on the mobile device. The machine learning model outputs a sound type indicator identifying the sound of running water. The running water sound type indicator may also be provided for other sources of running water (e.g., streams, garden hoses, water fountains, etc.).

In this example, the mobile device provides an alert 402 including a visualization of a showerhead for running water and text specifying that sound is detected and that a possible source of the sound is running water. In this example, the alert may include a color visualization (e.g., background) that is green in color. As mentioned above, the user may customize the alerts used for different types of sound type indicators.

Figure 5:
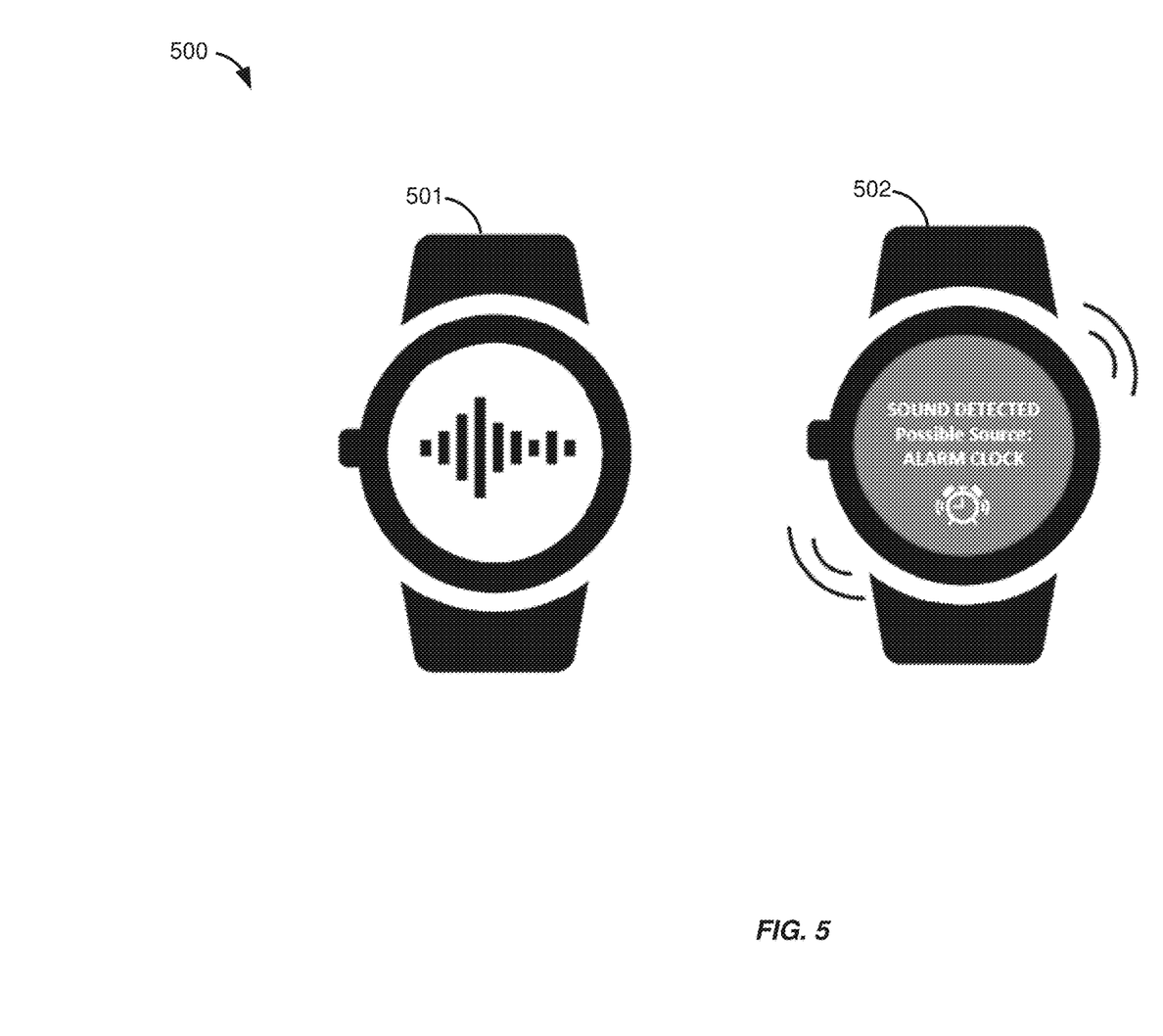
FIG. 5 shows a diagram of an exemplary sound recording and corresponding visual and haptic alert on a wearable device, according to an embodiment.

FIG. 5 shows a diagram 500 of an exemplary sound recording 501 and corresponding visual and haptic alert 502 on a wearable device, according to an embodiment. As described above, a wearable device (e.g., smartwatch) may persistently listen for sounds and when sound is detected the wearable device may send sound recording data to a sound detection system to determine a sound type indicator, or it may use a stored machine learning classification model to determine the sound type indicator.

In this example, the sound of an alarm clock is detected by a persistent listening algorithm and sound recording data representing the sound of the alarm clock is applied to a machine learning classification model, either one provided by the sound detection system over an application programming interface or a machine learning classification model stored on the mobile device. The machine learning model outputs a sound type indicator identifying the sound of the alarm clock. The alarm clock sound type indicator may also be provided for other sources of alarms (e.g., an alarm on a microwave, a timer alarm on the user's mobile device, etc.).

In this example, the wearable device provides an alert 502 including a visualization of a alarm clock and text specifying that sound is detected and that a possible source of the sound is an alarm clock. In this example, the alert may include a color visualization (e.g., background) that is blue in color. As mentioned above, the user may customize the alerts used for different types of sound type indicators.

Figure 6:
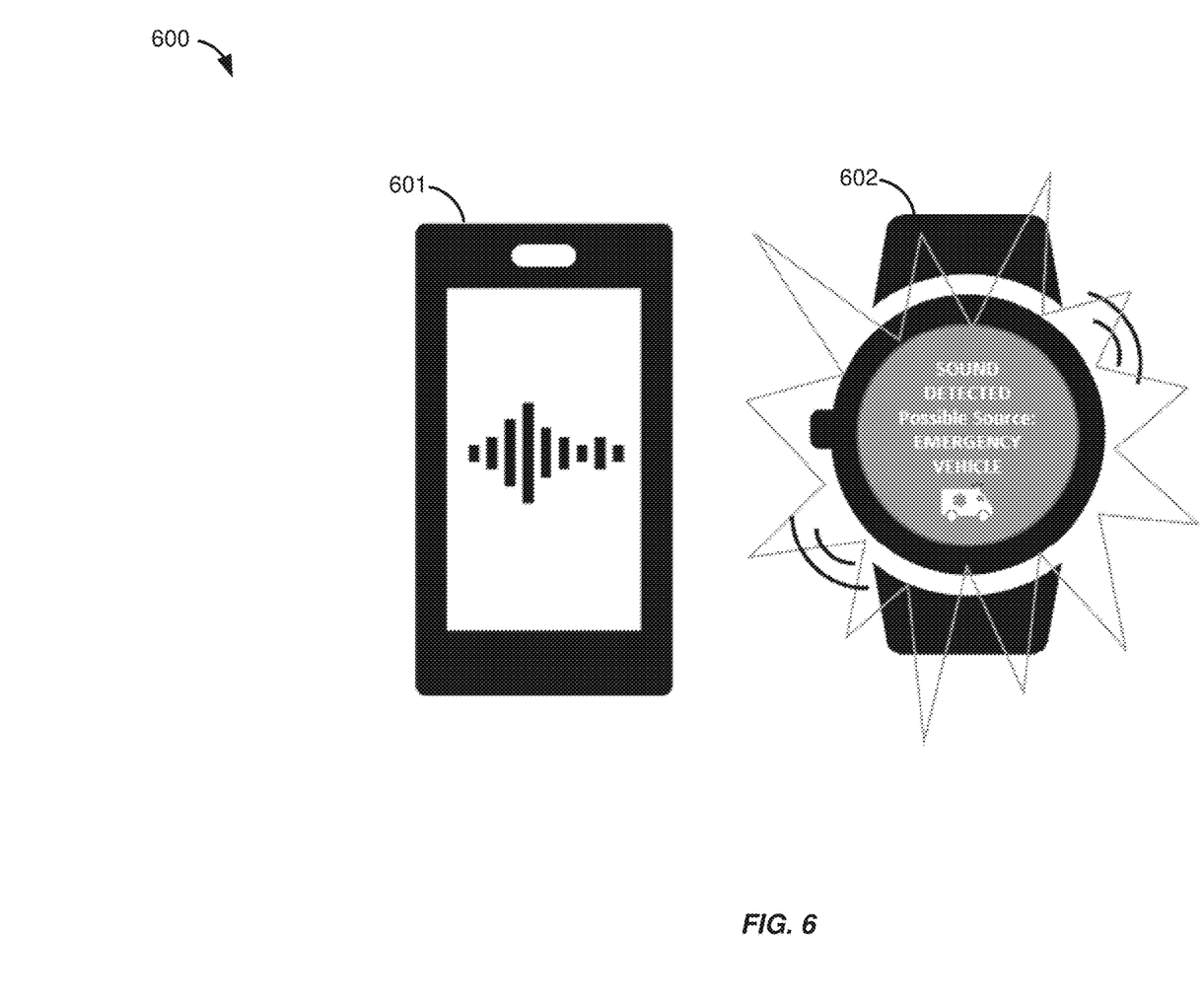
FIG. 6 shows a diagram of an exemplary sound recording on a mobile device and a corresponding visual and haptic alert on a wearable device, according to an embodiment.

FIG. 6 shows a diagram 600 of an exemplary sound recording 601 on a mobile device and a corresponding visual and haptic alert 602 on a wearable device, according to an embodiment. As described above, a mobile device (e.g., smartwatch) may persistently listen for sounds and when sound is detected the wearable device may send sound recording data to a sound detection system to determine a sound type indicator, or it may use a stored machine learning classification model to determine the sound type indicator.

In this example, the sound of an emergency vehicle siren is detected by a persistent listening algorithm on the mobile device and sound recording data representing the sound of the siren is applied to a machine learning classification model, either one provided by the sound detection system over an application programming interface or a machine learning classification model stored on the mobile device. The machine learning model outputs a sound type indicator identifying the sound of the emergency vehicle siren. The wearable device may receive a sound type indicator from the mobile device or it may receive the sound type indicator from a sound detection system. The emergency vehicle siren sound type indicator may also be provided for other sources of emergency vehicle sirens, such as emergency vehicles in various different countries and different types of emergency vehicles, such as fire trucks, police cars, and ambulances.

In this example, the wearable device provides an alert 602 including a visualization of an emergency vehicle and text specifying that sound is detected and that a possible source of the sound is an emergency vehicle. In this example, the alert may include a color visualization (e.g., background) that is red in color. As mentioned above, the user may customize the alerts used for different types of sound type indicators.

Figure 7:
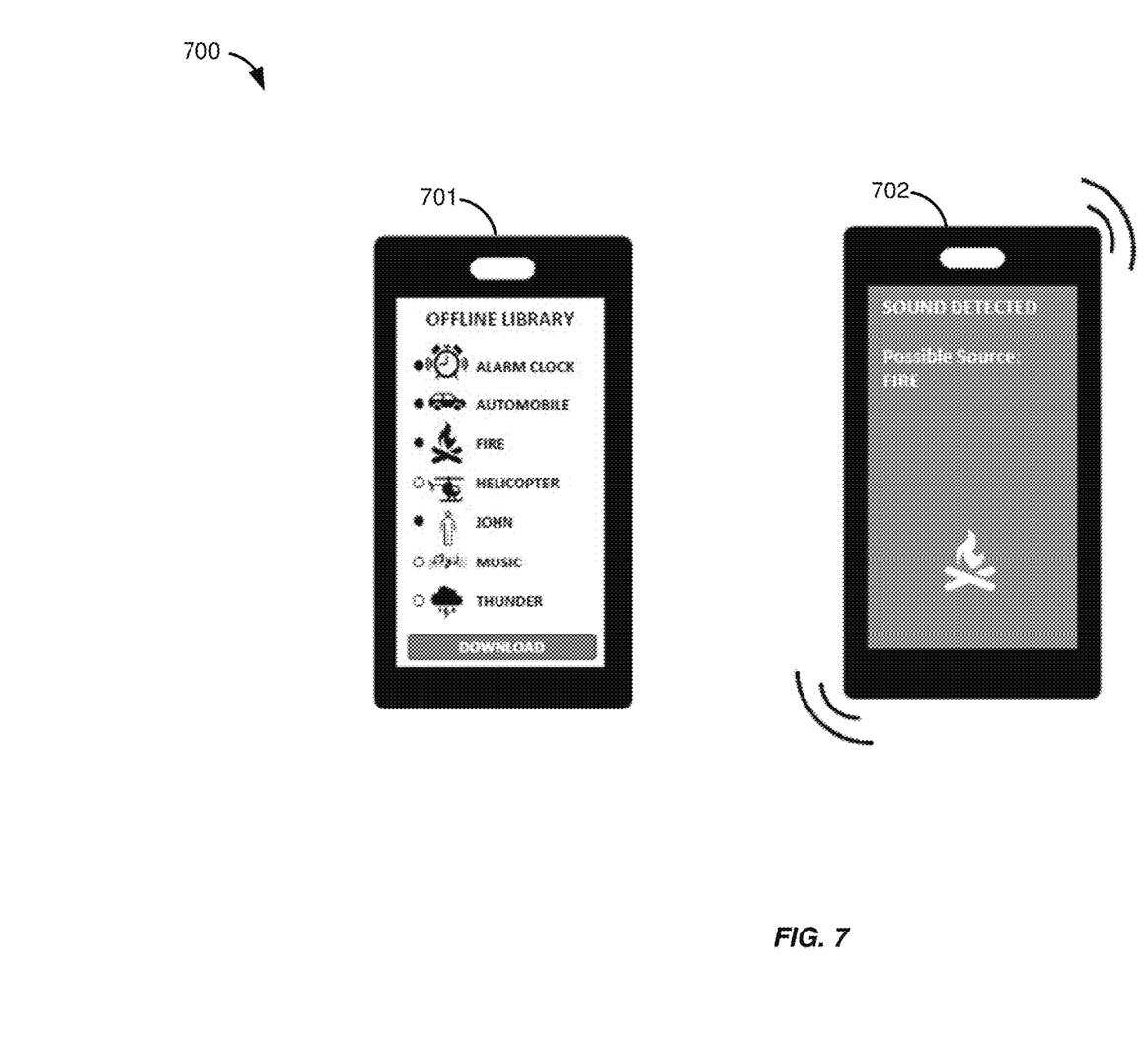
FIG. 7 shows a diagram of a user interface for selecting offline sound detection and a visual and haptic alert using offline sound detection, according to an embodiment.

FIG. 7 shows a diagram 700 of a user interface 701 for selecting offline sound detection and a visual and haptic alert 702 using offline sound detection, according to an embodiment. In this example, the application provides a user interface for selecting a set of sound type indicators (e.g., alarm clock, automobile, fire, helicopter, John (a particular person), music, and thunder). The selected sound type indicators (alarm clock, automobile, fire, and John) may be sent to the sound detection system. The sound detection system may identify a subset of the sound recording data in the sound library that are associated with indicators of the selected set and then generate a machine learning classification model based on that subset of the sound recording data. The machine learning classification model trained based on this subset may be sent to the user device and stored for use in performing offline sound detection.

One advantage of such an offline option is that it may avoid data privacy issues as users may not need to upload files to be processed in a cloud system, but could instead download models and process the detected sounds on their local device. For instance, the input data used for inference may remain on the users device.

In this example, the user selected "fire" and the stored machine learning classification model is capable of determining a fire sound type indicator from local sound recording data. In this example, the mobile device provides an alert 702 including a visualization of a fire and text specifying that sound is detected and that a possible source of the sound is a fire. In this example, the alert may include a color visualization (e.g., background) that is red in color. As mentioned above, the user may customize the alerts used for different types of sound type indicators.

Figure 8:
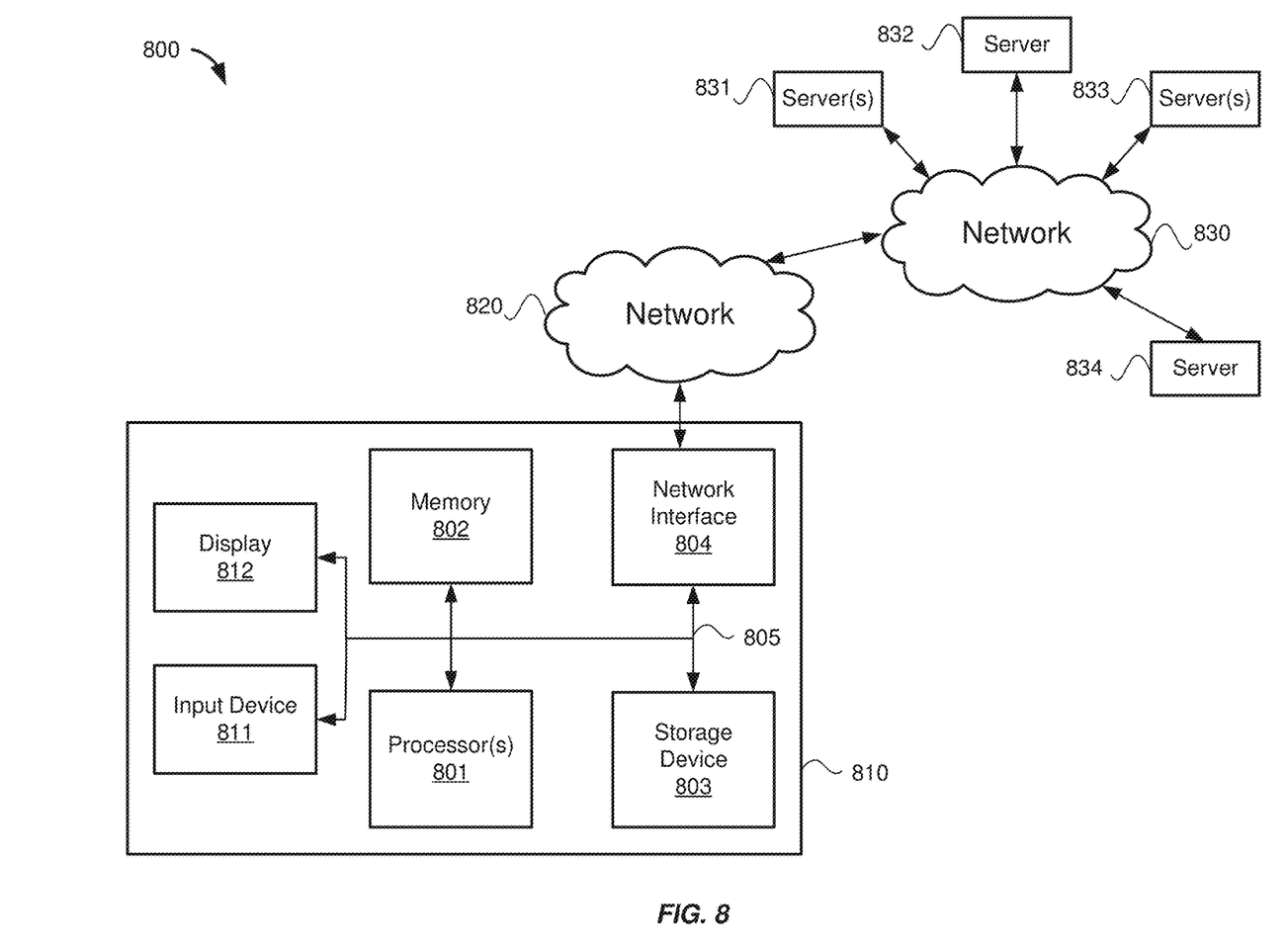
FIG. 8 shows a diagram of hardware of a special purpose computing system for implementing systems and methods described herein.

FIG. 8 shows a diagram 800 of hardware of a special purpose computing system 810 for implementing systems and methods described herein. The computer system 810 includes a bus 805 or other communication mechanism for communicating information, and one or more processors 801 coupled with bus 805 for processing information. The computer system 810 also includes a memory 802 coupled to bus 805 for storing information and instructions to be executed by processor 801, including information and instructions for performing some of the techniques described above, for example. This memory may also be used for storing programs executed by processor(s) 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 803 may include source code, binary code, or software files for performing the techniques above, such as the processes described above, for example. Storage device and memory are both examples of non-transitory computer readable storage mediums.

The computer system 810 may be coupled via bus 805 to a display 812 for displaying information to a computer user.

An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized buses, for example.

The computer system also includes a network interface 804 coupled with bus 805. The network interface 804 may provide two-way data communication between computer system 810 and a network 820. The network interface 804 may be a wireless or wired connection, for example. The computer system 810 can send and receive information through the network interface 804 across a local area network, an Intranet, a cellular network, or the Internet 830, for example. In the Internet example, a browser, for example, may access data and features on backend systems that may reside on multiple different hardware servers 831-834 across the network. The servers 831-834 may be part of a cloud computing environment, for example.

Additional Embodiments

Additional embodiments of the present disclosure are further described below.

One embodiment provides a computer system comprising one or more processors and one or more machine-readable medium coupled to the one or more processors. The one or more machine-readable medium storing computer program code comprises sets of instructions. The sets of instructions executable by the one or more processors to receive a first sound recording data object and a first sound type indicator from a first device. The first sound type indicator identifies a first type of entity that made a first sound represented by the first sound recording data object. The computer program code further comprises sets of instructions to store the first sound recording data object and the first sound type indicator in a database. The first sound type indicator is associated with the first sound recording data object in the database. The database includes a plurality of sound recording data objects where each of the plurality of sound recording data objects is associated with one or more of a plurality of sound type indicators. The plurality of sound recording data objects includes a set of sound recording data objects representing sounds made by the first type of entity. The computer program code further comprises sets of instructions to train a machine learning classification model based on the first sound recording data object from the first device, the first sound type indicator from the first device, the plurality of sound recording data objects, and the one or more of the plurality of sound type indicators associated with the plurality of sound recording data objects. The machine learning classification model is configured to receive an input sound recording data object and provide an output sound type indicator. The computer program code further comprises sets of instructions to receive a second sound recording data object from a second device. The second sound recording data object represents a second sound made by the first type of entity. The computer program code further comprises sets of instructions to determine that the second sound recording data object was made by the first type of entity by applying the second sound recording data object to the machine learning classification model. The computer program code further comprises sets of instructions to send the first sound type indicator identifying the first type of entity to the second device.

In some embodiments of the computer system, the sending of the first sound type indicator identifying the first type of entity to the second device causes the second device to generate an alert identifying the first type of entity to a user of the second device.

In some embodiments of the computer system, the alert includes one or more of a visual notification by the second device or a haptic notification by the second device.

In some embodiments of the computer system, the computer program code further comprises sets of instructions executable by the one or more processors to preprocess the first sound recording data object before the storing of the sound recording data object in the database.

In some embodiments of the computer system, the preprocessing of the first sound recording data object includes performing noise reduction on the first sound recording data object.

In some embodiments of the computer system, the computer program code further comprises sets of instructions executable by the one or more processors to preprocess the second sound recording data object before the applying the second sound recording data object to the machine learning classification model.

In some embodiments of the computer system, the computer program code further comprises sets of instructions executable by the one or more processors to provide the machine learning classification model to the first device or the second device.

Another embodiment provides one or more non-transitory computer-readable medium storing computer program code. The computer program code comprises sets of instructions to receive a first sound recording data object and a first sound type indicator from a first device. The first sound type indicator identifies a first type of entity that made a first sound represented by the first sound recording data object. The computer program code further comprises sets of instructions to store the first sound recording data object and the first sound type indicator in a database. The first sound type indicator is associated with the first sound recording data object in the database. The database includes a plurality of sound recording data objects where each of the plurality of sound recording data objects is associated with one or more of a plurality of sound type indicators. The plurality of sound recording data objects includes a set of sound recording data objects representing sounds made by the first type of entity. The computer program code further comprises sets of instructions to train a machine learning classification model based on the first sound recording data object from the first device, the first sound type indicator from the first device, the plurality of sound recording data objects, and the one or more of the plurality of sound type indicators associated with the plurality of sound recording data objects. The machine learning classification model is configured to receive an input sound recording data object and provide an output sound type indicator. The computer program code further comprises sets of instructions to receive a second sound recording data object from a second device. The second sound recording data object representing a second sound made by the first type of entity. The computer program code further comprises sets of instructions to determine that the second sound recording data object was made by the first type of entity by applying the second sound recording data object to the machine learning classification model. The computer program code further comprises sets of instructions to send the first sound type indicator identifying the first type of entity to the second device.

In some embodiments of the non-transitory computer-readable medium, the sending of the first sound type indicator identifying the first type of entity to the second device causes the second device to generate an alert identifying the first type of entity to a user of the second device.

In some embodiments of the non-transitory computer-readable medium, the alert includes one or more of a visual notification by the second device or a haptic notification by the second device.

In some embodiments of the non-transitory computer-readable medium, the computer program code further comprises sets of instructions to preprocess the first sound recording data object before the storing of the sound recording data object in the database.

In some embodiments of the non-transitory computer-readable medium, the preprocessing of the first sound recording data object including performing noise reduction on the first sound recording data object.

In some embodiments of the non-transitory computer-readable medium, the computer program code further comprises sets of instructions to preprocess the second sound recording data object before the applying the second sound recording data object to the machine learning classification model.

In some embodiments of the non-transitory computer-readable medium, the computer program code further comprises sets of instructions to provide the machine learning classification model to the first device or the second device.

Another embodiment provides a computer-implemented method. The method includes receiving a first sound recording data object and a first sound type indicator from a first device. The first sound type indicator identifies a first type of entity that made a first sound represented by the first sound recording data object. The method further includes storing the first sound recording data object and the first sound type indicator in a database. The first sound type indicator being associated with the first sound recording data object in the database. The database including a plurality of sound recording data objects where each of the plurality of sound recording data objects is associated with one or more of a plurality of sound type indicators. The plurality of sound recording data objects includes a set of sound recording data objects representing sounds made by the first type of entity. The method further includes training a machine learning classification model based on the first sound recording data object from the first device, the first sound type indicator from the first device, the plurality of sound recording data objects, and the one or more of the plurality of sound type indicators associated with the plurality of sound recording data objects. The machine learning classification model configured to receive an input sound recording data object and provide an output sound type indicator. The method further includes receiving a second sound recording data object from a second device. The second sound recording data object representing a second sound made by the first type of entity. The method further includes determining that the second sound recording data object was made by the first type of entity by applying the second sound recording data object to the machine learning classification model. The method further includes sending the first sound type indicator identifying the first type of entity to the second device.

In some embodiments of the computer-implemented method, the sending of the first sound type indicator identifying the first type of entity to the second device causes the second device to generate an alert identifying the first type of entity to a user of the second device.

In some embodiments of the computer-implemented method, the alert includes one or more of a visual notification by the second device or a haptic notification by the second device.

In some embodiments of the computer-implemented method, the method further comprises preprocessing the first sound recording data object before the storing of the sound recording data object in the database and preprocessing the second sound recording data object before the applying the second sound recording data object to the machine learning classification model.

In some embodiments of the computer-implemented method, the preprocessing of the first sound recording data object including performing noise reduction on the first sound recording data object.

In some embodiments of the computer-implemented method, the method further comprises providing the machine learning classification model to the first device or the second device.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer system, comprising:
   one or more processors; and
   one or more machine-readable media coupled to the one or more processors and storing computer program code comprising sets of instructions executable by the one or more processors to:
   receive a first sound recording data object and a first sound type indicator from a first device, the first sound type indicator identifying a first type of entity that made a first sound represented by the first sound recording data object;
   store the first sound recording data object and the first sound type indicator in a database, the first sound type indicator being associated with the first sound recording data object in the database, the database including a plurality of sound recording data objects, each of the plurality of sound recording data objects being associated with one or more of a plurality of sound type indicators, the plurality of sound recording data objects including a set of sound recording data objects representing sounds made by the first type of entity;
   provide to a machine learning classification model based on the first sound recording data object from the first device, the first sound type indicator from the first device, the plurality of sound recording data objects, and the one or more of the plurality of sound type indicators associated with the plurality of sound recording data objects, the machine learning classification model configured to receive an input sound recording data object and provide an output sound type indicator;
   train a machine learning classification model based on a sound library, user provided sound recording data, user provided sound type indicators, the first sound recording data object from the first device, the first sound type indicator from the first device, the plurality of sound recording data objects, and the one or more of the plurality of sound type indicators associated with the plurality of sound recording data objects;

receive a second sound recording data object from a second device, the second sound recording data object representing a second sound made by the first type of entity;

determine that the second sound recording data object was made by the first type of entity identified by the first sound type indicator by applying the second sound recording data object to the machine learning classification model;

send the first sound type indicator identifying the first type of entity to the second device causing the second device to generate an alert identifying the first type of entity to a user of the second device; and provide the user through the second device with customized options regarding delivery of the alert as icons, text, visualizations, tactile, or haptic techniques on or by the second device.

2. The computer system of claim 1, wherein the alert includes one or more of a visual notification by the second device or a haptic notification by the second device.

3. The computer system of claim 1, wherein the computer program code further comprises sets of instructions executable by the one or more processors to:
preprocess the first sound recording data object before the storing of the first sound recording data object in the database.

4. The computer system of claim 3, wherein the preprocessing of the first sound recording data object includes performing noise reduction on the first sound recording data object.

5. The computer system of claim 3, wherein the computer program code further comprises sets of instructions executable by the one or more processors to:
preprocess the second sound recording data object before the applying the second sound recording data object to the machine learning classification model.

6. The computer system of claim 1, wherein the computer program code further comprises sets of instructions executable by the one or more processors to:
provide the machine learning classification model to the first device or the second device.

7. The computer system of claim 1, wherein the machine learning classification model is located on a cloud platform and accessed through a computer server.

8. One or more non-transitory computer-readable media storing computer program code comprising sets of instructions to:
receive a first sound recording data object and a first sound type indicator from a first device, the first sound type indicator identifying a first type of entity that made a first sound represented by the first sound recording data object;

store the first sound recording data object and the first sound type indicator in a database, the first sound type indicator being associated with the first sound recording data object in the database, the database including a plurality of sound recording data objects, each of the plurality of sound recording data objects being associated with one or more of a plurality of sound type indicators, the plurality of sound recording data objects including a set of sound recording data objects representing sounds made by the first type of entity;

provide to a machine learning classification model based on the first sound recording data object from the first device, the first sound type indicator from the first device, the plurality of sound recording data objects, and the one or more of the plurality of sound type indicators associated with the plurality of sound recording data objects, the machine learning classification model configured to receive an input sound recording data object and provide an output sound type indicator;

train a machine learning classification model based on a sound library, user provided sound recording data, user provided sound type indicators, the first sound recording data object from the first device, the first sound type indicator from the first device, the plurality of sound recording data objects, and the one or more of the plurality of sound type indicators associated with the plurality of sound recording data objects;

receive a second sound recording data object from a second device, the second sound recording data object representing a second sound made by the first type of entity;

determine that the second sound recording data object was made by the first type of entity by applying the second sound recording data object to the machine learning classification model;

send the first sound type indicator identifying the first type of entity to the second device causing the second device to generate an alert identifying the first type of entity to a user of the second device; and provide the user through the second device with customized options regarding delivery of the alert as icons, text, visualizations, tactile, or haptic techniques on or by the second device.

9. The non-transitory computer-readable media of claim 7, wherein the alert includes one or more of a visual notification by the second device or a haptic notification by the second device.

10. The non-transitory computer-readable media of claim 8, wherein the computer program code further comprises sets of instructions to:
preprocess the first sound recording data object before the storing of the first sound recording data object in the database.

11. The non-transitory computer-readable media of claim 10, wherein the preprocessing of the first sound recording data object includes performing noise reduction on the first sound recording data object.

12. The non-transitory computer-readable media of claim 10, wherein the computer program code further comprises sets of instructions to:
preprocess the second sound recording data object before the applying the second sound recording data object to the machine learning classification model.

13. The non-transitory computer-readable media of claim 8, wherein the computer program code further comprises sets of instructions to:
provide the machine learning classification model to the first device or the second device.

14. The non-transitory computer readable media of claim 8, wherein the machine learning classification model is located on a cloud platform and accessed through a computer server.

15. A computer-implemented method, comprising:
receiving a first sound recording data object and a first sound type indicator from a first device, the first sound type indicator identifying a first type of entity that made a first sound represented by the first sound recording data object;

storing the first sound recording data object and the first sound type indicator in a database, the first sound type indicator being associated with the first sound recording data object in the database, the database including a plurality of sound recording data objects, each of the plurality of sound recording data objects being associated with one or more of a plurality of sound type indicators, the plurality of sound recording data objects including a set of sound recording data objects representing sounds made by the first type of entity;

providing to a machine learning classification model based on the first sound recording data object from the first device, the first sound type indicator from the first device, the plurality of sound recording data objects, and the one or more of the plurality of sound type indicators associated with the plurality of sound recording data objects, the machine learning classification model configured to receive an input sound recording data object and provide an output sound type indicator;

training a machine learning classification model based on a sound library, user provided sound recording data, user provided sound type indicators, the first sound recording data object from the first device, the first sound type indicator from the first device, the plurality of sound recording data objects, and the one or more of the plurality of sound type indicators associated with the plurality of sound recording data objects;

receiving a second sound recording data object from a second device, the second sound recording data object representing a second sound made by the first type of entity;

determining that the second sound recording data object was made by the first type of entity by applying the second sound recording data object to the machine learning classification model;

sending the first sound type indicator identifying the first type of entity to the second device causing the second device to generate an alert identifying the first type of entity to a user of the second device; and providing the user through the second device with customized options regarding delivery of the alert as icons, text, visualizations, tactile, or haptic techniques on or by the second device.

16. The computer-implemented method of claim 15, wherein the alert includes one or more of a visual notification by the second device or a haptic notification by the second device.

17. The computer-implemented method of claim 15, further comprising:
preprocessing the first sound recording data object before the storing of the first sound recording data object in the database; and
preprocessing the second sound recording data object before the applying the second sound recording data object to the machine learning classification model.

18. The computer-implemented method of claim 17, wherein the preprocessing of the first sound recording data object includes performing noise reduction on the first sound recording data object.

19. The computer-implemented method of claim 15, further comprising:
providing the machine learning classification model to the first device or the second device.

20. The computer-implemented method of claim 15, wherein the machine learning classification model is located on a cloud platform and accessed through a computer server.

* * * * *